E. CRISANDT.
HYDRAULIC PIPE PROVER.
APPLICATION FILED AUG. 8, 1911.
1,034,426.
Patented Aug. 6, 1912.
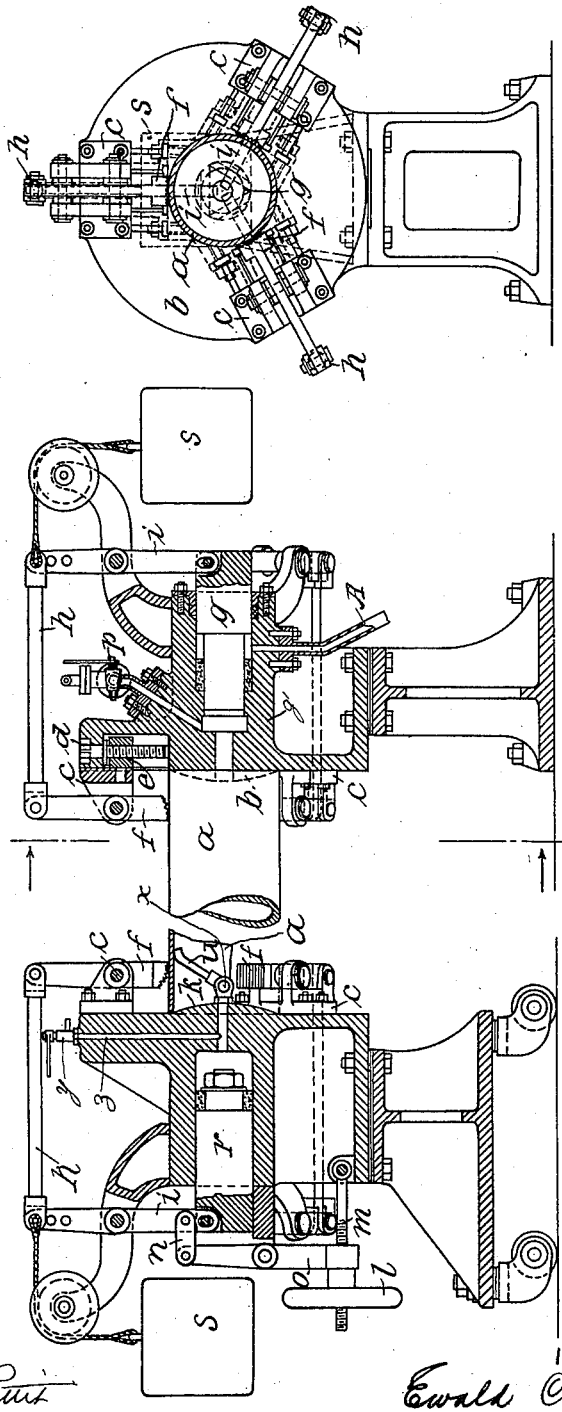
WITNESSES
INVENTOR
Ewald Crisandt
ATTY.

UNITED STATES PATENT OFFICE.

EWALD CRISANDT, OF DUSSELDORF, GERMANY.

HYDRAULIC PIPE-PROVER.

1,034,426.

Specification of Letters Patent. Patented Aug. 6, 1912.

Application filed August 8, 1911. Serial No. 643,054.

*To all whom it may concern:*

Be it known that I, EWALD CRISANDT, engineer, subject of the Emperor of Germany, residing at Dusseldorf, Germany, have invented new and useful Improvements in Hydraulic Pipe-Provers, of which the following is a specification.

My invention relates to pipe-provers, and a primary object is to provide a pipe-prover adapted to prove pipes of any desired length and shape.

My improved pipe-prover has the great advantage that when the pipes to be proved are subjected to pressure they are subjected to strain exactly as is actually the case when they are in use. The arrangement of the same is as follows: The machine comprises a stationary gripping head, and a gripping head able to be moved in all directions, all rods or bolts connecting the two heads which have always been used heretofore being omitted. The setting up of a pipe to be proved is effected hydraulically as explained hereinafter.

One illustrative embodiment of the invention is represented by way of example in said drawing, wherein:—

Figure 1 is a vertical longitudinal section of my pipe-prover carrying a pipe to be proved, and Fig. 2 is an end elevation of the stationary head as seen from between the two heads, the pipe to be proved being shown in section.

Referring to the drawing, the pipe $a$ to be proved is first placed against the stationary head $b$ carrying at its periphery three or more levers or dogs $f$; each of these is mounted on a slide $c$ and can be adjusted by means of a spindle $d$ and nut $e$ for larger and smaller pipes. Water under pressure can be supplied through the pipe A into the cylinder $g'$ in the head, whereupon the differential piston $g$ in the cylinder is forced to the right and the pipe $a$ is forced against the head $b$ by means of the dogs $f$ through the medium of the rods $h$ and the levers $i$ connected with the piston $g$. The pipe $a$ is then provisionally set up at the traveling or movable head $k$ by hand by means of the hand-wheel $l$, spindle $m$, lever $o$, links $n$ and levers $i$ as it would be too troublesome to supply water under pressure, because the head is sometimes located at one place and at other times at another. When the pipe $a$ has thus been provisionally set up at both the right and left, water is allowed to enter through the valve $p$ at the stationary head, whereby the pipe $a$ is filled with water. As the water enters the pipe $a$ the air contained therein is allowed to escape through an air release pipe $u$ which communicates with a conduit $z$ leading to a valve $y$ which is opened during the filling of the pipe $a$ with water. The pipe $u$ is connected to the head $k$ by a hinged joint, whereby it may be adjusted in order that its open free end will lie at the upper surface of the pipe. As soon as water issues from the valve $y$ it is closed. The pipe $u$ also communicates with a chamber in which a piston $r$ is reciprocatingly mounted. When the pipe is quite full and the higher proof-pressure is applied, the pressure is imparted on the one hand to the differential piston $g$ and on the other hand through the air-release pipe $u$ to the piston $r$ of the displaceable head. The piston $r$ is then forced to the left and the pipe $a$ is more firmly pressed against the heads by means of the claws or dogs $f$, so that the water under pressure cannot issue at its ends. The weights $s$ serve for pushing back the pistons $r$ and $g$ after the pipe has been proved.

I claim:—

1. In a hydraulic pipe prover, in combination, a hydraulically operated gripping head, means for holding one end of the pipe to be proved against said head, said head having a duct for supplying the water under pressure into the pipe to be proved, a traveling gripping head, means for holding the other end of the pipe to be proved against said traveling head, said traveling head having a duct for receiving water under pressure from the pipe to be proved, and means actuated by the pressure of the water in the pipe transmitted through the duct for actuating said holding means associated with said traveling head.

2. In a hydraulic pipe-prover, the combination, with a hydraulically-operated gripping head comprising a cylinder, a piston therein, and dogs operatively connected with the piston and adapted to hold one end of a pipe to be proved against the head, of a traveling gripping head comprising a cylinder, a piston therein, and dogs operatively connected with the piston and adapted to hold the other end of the pipe to be proved against the traveling head, each head having a duct for connecting the cylinders with the interior of the pipe to be proved set up between the said heads, and means for supplying water under pressure to the duct in the former head.

3. In a hydraulic pipe-prover, the combination of a gripping-head frame having an annular face for the end of a pipe and containing a cylinder opening within the face, a piston in the cylinder, levers adjustably and pivotally mounted on the frame in proximity to the said face, and means operatively connecting the levers with the piston, the arrangement being such that when the piston moves away from the said face, the ends of the levers nearer the face are approached thereto.

In testimony whereof I have signed my name to this specification in the presence of two subscribing witnesses.

EWALD CRISANDT. [L. S.]

Witnesses:
CHAS. J. WRIGHT,
ALBERT F. NUFER.

Copies of this patent may be obtained for five cents each, by addressing the "Commissioner of Patents, Washington, D. C."